UNITED STATES PATENT OFFICE.

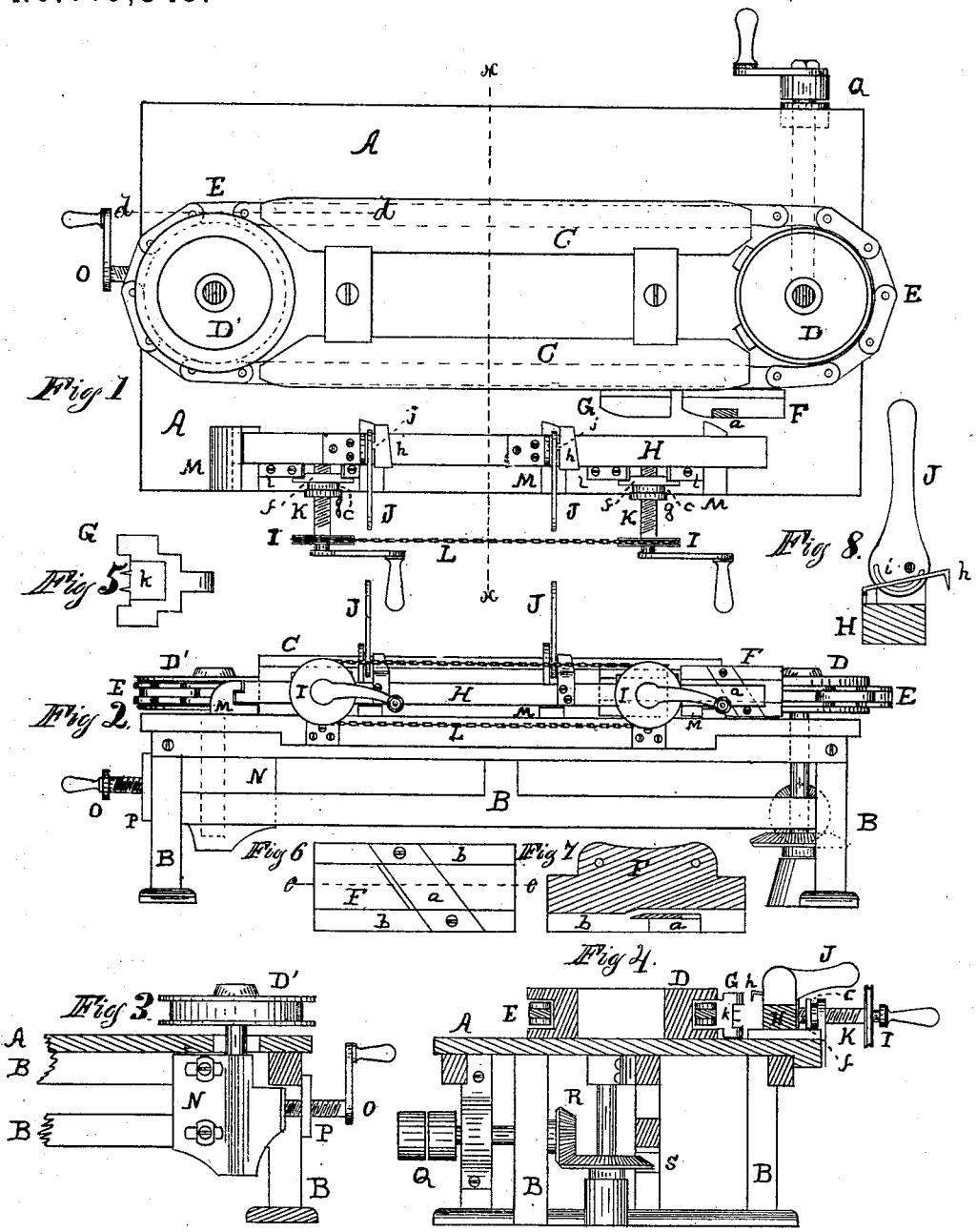

SAMUEL I. RUSSELL, OF CHICAGO, ILLINOIS.

IMPROVEMENT IN MACHINE FOR CUTTING BASKET-SPLINTS.

Specification forming part of Letters Patent No. 149,343, dated April 7, 1874; application filed September 17, 1872.

*To all whom it may concern:*

Be it known that I, SAMUEL I. RUSSELL, of the city of Chicago, in the county of Cook and State of Illinois, have invented a certain new and useful Improvement in Machines for Cutting Basket-Splints, of which the following is a full description, reference being had to the accompanying drawings, making a part of this specification, in which—

Figure 1 is a top or plan view; Fig. 2, a side view; Fig. 3, a partial section on line *d d* of Fig. 1; Fig. 4, a cross-section on line *x x* of Fig. 1; Fig. 5, an end view of the block *g* detached; Fig. 6, a side view of the cutting-block; Fig. 7, a longitudinal section on line *e e* of Fig. 6; and Fig. 8, a detail, showing the mode of operating the dogs.

The object of this invention is to provide a machine for cutting basket-splints of proper thickness and dimension from the edge of plank or other suitable prepared timber; and its nature consists in the mode of attaching and operating the knives, in the adjustment of the feed, and in the several improved combinations hereinafter set forth and claimed.

In the drawings, A represents the top or bed plate of the machine; B, the supporting frame-work; C, the guide-bars for supporting the endless chain and holding it in position; D, sprocket-wheel; D', guide and tension wheel; E, endless chain; F, cutter-block; G, spur-block, both attached to the endless chain E; H, feed-bar; I, chain or pulley wheels; J, dog-levers; K, screws for moving the feed-bar; L, chain connecting the screws K, so as to cause the feed-bar to advance uniformly at each end; M, guides for feed-bar; N, adjusting-plate supporting the shaft of the wheel D'; O, screw for adjusting the plate N; P, nut of the screw O; Q, pulley to which the power is applied; R S, miter or other suitable gear-wheels for driving the sprocket-wheel D; *a*, knife in the cutting-block F; *b*, guide-flanges on said block; *c*, springs for permitting a slight yielding of the feed-bar H; *g*, supporting-plates for the springs *c*; *f*, screw nuts or plates for the screws K; *h*, dogs; *i*, eccentric groove in the dog-lever J; *j*, pins or projections on the dogs *h*, which pass into the grooves *i*, and by means of which the dogs are raised or lowered; *k*, spur-cutter on the block G; *l*, supports or stops for nut *f*. The feed-bar H may be made in two longitudinal sections, and the springs *c* placed between the sections, or single, as shown. A similar feeding device may be placed on the opposite side, so as to do double work in the same machine. The bar H, against which the plank is held by means of the dogs *h*, is supported against the pressure of the knives by the grooved block M, which prevents displacement and relieves the feed-screws K from strain. The screws K pass through the plates *f*, which are provided with screw-threads, and are supported against the stops *l*, and also through a standard or plate, *g*, between which two said plates the springs *c* are located. I usually make the springs *c* of rubber, but they may be made of metal, if desired. The screws K are swiveled to the bar H, and are connected together by means of the chain L, so that their movements correspond, and, as shown, a crank is applied to each screw, so that the feeding device can be operated from either end. Either one of the cranks, however, may be dispensed with, if desired. The dogs *h* are operated by means of the levers J, and are forced into the plank or timber by the eccentric groove or slot *i* and side projection *j* of the dog. By the use of this arrangement I can use hinged dogs; but, by using spring-dogs, the groove *i* and projection *j* may be dispensed with, and the eccentric end of the lever made to operate directly upon the top of the dog; but I prefer the hinged dogs, and the arrangement shown for operating them. The chain E is made of solid and flat links, in the usual form of flat or angular chains, and the blocks F G are so arranged upon their backs as to each have a link in the chain. If desired, the spur-cutter *k* may be attached to the front end of the block F, but I consider it an improvement to attach it to a separate block, G, as shown, for the reason that each cutter can be brought into operation nearly opposite the shaft of the sprocket-wheel, whereas, if they were both on one block, the rear one must be brought into position before the front one commences cutting. The spur-cutter *k* gives the proper width to the splints; and the cutter *a* separates them from the plank. The chain E is kept properly strained by means of the screw O and movable plate N, which supports the guide-wheel D'. The bed-plate and the plate N are provided with suitable slots for this purpose. The frame-work A B and bar H are usually made of wood; but the entire machine may be made of metal, if desired.

What I claim as new is as follows:

1. The combination of chain E, constructed and operated as described, block F, provided with a knife, a, and feed-bar H, substantially as specified.

2. The combination of the spur-block G with the cutter-block F and chain E, so that by coming into operation nearer the wheel longer planks can be cut, substantially as described.

3. The combination of the bar H with the springs c and screws K, substantially as and for the purpose specified.

4. The combination and arrangement of the wheels D D', chain E, guide-bars C, cutter-block F, feed-bar H, screws K, and springs c, substantially as set forth.

S. I. RUSSELL.

Witnesses:
E. A. WEST,
O. W. BOND.